(12) United States Patent
Joe et al.

(10) Patent No.: US 9,195,340 B2
(45) Date of Patent: Nov. 24, 2015

(54) KEY DISPLAY DEVICE AND RECORDING MEDIUM

(71) Applicant: FUJITSU LIMITED, Kawasaki-shi, Kanagawa (JP)

(72) Inventors: Hideaki Joe, Funabashi (JP); Nao Horiguchi, Yokohama (JP); Jun Tojo, Kawasaki (JP); Junya Yamaguchi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 11 days.

(21) Appl. No.: 14/138,846

(22) Filed: Dec. 23, 2013

(65) Prior Publication Data

US 2014/0111439 A1    Apr. 24, 2014

Related U.S. Application Data

(63) Continuation of application No. PCT/JP2011/068533, filed on Aug. 15, 2011.

(51) Int. Cl.
*G06F 3/041* (2006.01)
*G06F 3/0488* (2013.01)

(52) U.S. Cl.
CPC .......... *G06F 3/0416* (2013.01); *G06F 3/04883* (2013.01); *G06F 3/04886* (2013.01)

(58) Field of Classification Search
CPC .......... G06F 3/02; G06F 3/041; G06F 3/045; G09G 5/00
USPC .................................................. 345/168–175
See application file for complete search history.

(56) References Cited

U.S. PATENT DOCUMENTS

| 8,648,823 | B2* | 2/2014 | Koch et al. ..................... 345/173 |
| 2011/0242138 | A1* | 10/2011 | Tribble .......................... 345/663 |
| 2012/0113023 | A1* | 5/2012 | Koch et al. ..................... 345/173 |

FOREIGN PATENT DOCUMENTS

| JP | 9-319502 | 12/1997 |
| JP | 11-305896 | 11/1999 |
| JP | 2008-233483 | 10/2008 |
| JP | 2010-86400 | 4/2010 |

OTHER PUBLICATIONS

International Search Report, mailed in connection with PCT/JP2011/068533 and mailed Nov. 15, 2011.

(Continued)

*Primary Examiner* — Pegeman Karimi
(74) *Attorney, Agent, or Firm* — Fujitsu Patent Center (57) ABSTRACT

A mobile electronic device includes a touch panel, a display unit, and a CPU that displays a key on the display unit and, when a key group of a soft keyboard that has a plurality of keys arranged within a predetermined area is displayed on the display unit, the CPU displays, in a switchable manner, first arrangement in which each key of the key group is arranged within the predetermined area and second arrangement in which at least one of the keys of the key group is deleted or arranged in a size smaller than that of a key that is in the first arrangement and that corresponds to the one of the keys and in which a handwriting input area is arranged at a space area that is generated within the predetermined area as the one of the keys is deleted or arranged in a smaller size.

2 Claims, 9 Drawing Sheets

(56) References Cited

OTHER PUBLICATIONS

EESR—Extended European Search Report of European Patent Application No. 11871084.7 mailed Jan. 9, 2015.

JPOA—Office Action of Japan Patent Application No. 2013-528881, mailed on Jun. 2, 2015, with English translation of the relevant part, p. 1, line 20 to p. 1, line 31.

* cited by examiner

| ID | TYPE | NAME | X-COORDINATE | Y-COORDINATE | KEY WIDTH | KEY HEIGHT | KEY CODE | ID | TYPE | NAME | X-COORDINATE | Y-COORDINATE | KEY WIDTH | KEY HEIGHT | KEY CODE |
|---|---|---|---|---|---|---|---|---|---|---|---|---|---|---|---|
| 1 | Q | 1 | 0 | 0 | 30 | 30 | 0x31 | 43 | DQ | 1 | 0 | 0 | 20 | 30 | 0x31 |
| 2 | Q | 2 | 30 | 0 | 30 | 30 | 0x32 | 44 | DQ | 2 | 20 | 0 | 20 | 30 | 0x32 |
| 3 | Q | 3 | 60 | 0 | 30 | 30 | 0x33 | 45 | DQ | 3 | 40 | 0 | 20 | 30 | 0x33 |
| 4 | Q | 4 | 90 | 0 | 30 | 30 | 0x34 | 46 | DQ | 4 | 60 | 0 | 20 | 30 | 0x34 |
| 5 | Q | 5 | 120 | 0 | 30 | 30 | 0x35 | 47 | DQ | 5 | 80 | 0 | 20 | 30 | 0x35 |
| 6 | Q | 6 | 150 | 0 | 30 | 30 | 0x36 | 48 | DQ | 6 | 260 | 0 | 20 | 30 | 0x36 |
| 7 | Q | 7 | 180 | 0 | 30 | 30 | 0x37 | 49 | DQ | 7 | 280 | 0 | 20 | 30 | 0x37 |
| 8 | Q | 8 | 210 | 0 | 30 | 30 | 0x38 | 50 | DQ | 8 | 300 | 0 | 20 | 30 | 0x38 |
| 9 | Q | 9 | 240 | 0 | 30 | 30 | 0x39 | 51 | DQ | 9 | 320 | 0 | 20 | 30 | 0x39 |
| 10 | Q | 0 | 270 | 0 | 30 | 30 | 0x30 | 52 | DQ | 0 | 340 | 0 | 20 | 30 | 0x30 |
| 11 | Q | BS | 300 | 0 | 60 | 30 | 0x08 | 54 | DQ | Q | 0 | 30 | 20 | 30 | 0x51 |
| 12 | Q | Q | 10 | 30 | 30 | 30 | 0x51 | 55 | DQ | W | 20 | 30 | 20 | 30 | 0x57 |
| 13 | Q | W | 40 | 30 | 30 | 30 | 0x57 | 56 | DQ | E | 40 | 30 | 20 | 30 | 0x45 |
| 14 | Q | E | 70 | 30 | 30 | 30 | 0x45 | 57 | DQ | R | 60 | 30 | 20 | 30 | 0x52 |
| 15 | Q | R | 100 | 30 | 30 | 30 | 0x52 | 58 | DQ | T | 80 | 30 | 20 | 30 | 0x54 |
| 16 | Q | T | 130 | 30 | 30 | 30 | 0x54 | 59 | DQ | Y | 260 | 30 | 20 | 30 | 0x59 |
| 17 | Q | Y | 160 | 30 | 30 | 30 | 0x59 | 60 | DQ | U | 280 | 30 | 20 | 30 | 0x55 |
| 18 | Q | U | 190 | 30 | 30 | 30 | 0x55 | 61 | DQ | I | 300 | 30 | 20 | 30 | 0x49 |
| 19 | Q | I | 220 | 30 | 30 | 30 | 0x49 | 62 | DQ | O | 320 | 30 | 20 | 30 | 0x4f |
| 20 | Q | O | 250 | 30 | 30 | 30 | 0x4f | 63 | DQ | P | 340 | 30 | 20 | 30 | 0x50 |
| 21 | Q | P | 280 | 30 | 30 | 30 | 0x50 | 65 | DQ | A | 0 | 60 | 20 | 30 | 0x41 |
| 22 | Q | Ent | 310 | 30 | 50 | 30 | 0x0a | 66 | DQ | S | 20 | 60 | 20 | 30 | 0x53 |
| 23 | Q | A | 20 | 60 | 30 | 30 | 0x41 | 67 | DQ | D | 40 | 60 | 20 | 30 | 0x44 |
| 24 | Q | S | 50 | 60 | 30 | 30 | 0x53 | 68 | DQ | F | 60 | 60 | 20 | 30 | 0x46 |
| 25 | Q | D | 80 | 60 | 30 | 30 | 0x44 | 69 | DQ | G | 80 | 60 | 20 | 30 | 0x47 |
| 26 | Q | F | 110 | 60 | 30 | 30 | 0x46 | 70 | DQ | H | 260 | 60 | 20 | 30 | 0x48 |
| 27 | Q | G | 140 | 60 | 30 | 30 | 0x47 | 71 | DQ | J | 280 | 60 | 20 | 30 | 0x4a |
| 28 | Q | H | 170 | 60 | 30 | 30 | 0x48 | 72 | DQ | K | 300 | 60 | 20 | 30 | 0x4b |
| 29 | Q | J | 200 | 60 | 30 | 30 | 0x4a | 73 | DQ | L | 320 | 60 | 20 | 30 | 0x4c |
| 30 | Q | K | 230 | 60 | 30 | 30 | 0x4b | 53 | DQ | BS | 340 | 0 | 20 | 30 | 0x08 |
| 31 | Q | L | 260 | 60 | 30 | 30 | 0x4c | 75 | DQ | Z | 0 | 90 | 20 | 30 | 0x5a |
| 32 | Q | ; | 290 | 60 | 30 | 30 | 0x3b | 76 | DQ | X | 20 | 90 | 20 | 30 | 0x58 |
| 33 | Q | Z | 30 | 90 | 30 | 30 | 0x5a | 77 | DQ | C | 40 | 90 | 20 | 30 | 0x43 |
| 34 | Q | X | 60 | 90 | 30 | 30 | 0x58 | 78 | DQ | V | 60 | 90 | 20 | 30 | 0x56 |
| 35 | Q | C | 90 | 90 | 30 | 30 | 0x43 | 79 | DQ | B | 80 | 90 | 20 | 30 | 0x42 |
| 36 | Q | V | 120 | 90 | 30 | 30 | 0x56 | 80 | DQ | N | 260 | 90 | 20 | 30 | 0x4e |
| 37 | Q | B | 150 | 90 | 30 | 30 | 0x42 | 81 | DQ | M | 280 | 90 | 20 | 30 | 0x4d |
| 38 | Q | N | 180 | 90 | 30 | 30 | 0x4e | 82 | DQ | , | 300 | 90 | 20 | 30 | 0x2c |
| 39 | Q | M | 210 | 90 | 30 | 30 | 0x4d | 83 | DQ | . | 320 | 90 | 20 | 30 | 0x2e |
| 40 | Q | , | 240 | 90 | 30 | 30 | 0x2c | 84 | DQ | Ent | 340 | 30 | 20 | 30 | 0x0a |
| 41 | Q | . | 270 | 90 | 30 | 30 | 0x2e | ⋮ | ⋮ | ⋮ | ⋮ | ⋮ | ⋮ | ⋮ | ⋮ |
| 42 | Q | / | 300 | 90 | 30 | 30 | 0x2f | | | | | | | | |

KEY DISPLAY DEVICE AND RECORDING MEDIUM

CROSS-REFERENCE TO RELATED APPLICATION

This application is a continuation application of International Application PCT/JP2011/068533, filed on Aug. 15, 2011, and designating the U.S., the entire contents of which are incorporated herein by reference.

FIELD

The present invention relates to a mobile electronic device and a recording medium.

BACKGROUND

For example, in mobile electronic devices that include a display unit that has a touch panel function, a function is provided therein to receive an input of a character through a touch operation on a software keyboard (hereafter, simply referred to as the soft keyboard) that is displayed on the display unit. Furthermore, it is known that mobile electronic devices have a function to receive an input of a character through a handwriting operation on the soft keyboard in addition to the function to receive an input of a character through a touch operation on the soft keyboard.

Moreover, mobile electronic devices discriminate between an input of a character through a touch operation on the soft keyboard and an input of a character through a handwriting operation on the soft keyboard. For example, if the coordinates of the starting point and the terminal point of the handwriting operation are within the coordinate area of the same key, the mobile electronic device determines that a character is input by a touch operation on the soft keyboard. Conversely, if the coordinates of the starting point and the terminal point of the handwriting operation are not within the coordinate area of the same key, the mobile electronic device determines that a character is input by a handwriting operation.

Patent Literature 1: Japanese Patent Application Laid-open No. 09-319502

However, there is a possibility that, when a character is input by, for example, a handwriting operation, the first stroke of the character to be input is short and the coordinates of the starting point and the terminal point fall within the coordinate area of the same key. For instance, when a character is input by a handwriting operation, the first written stroke is short, and the coordinates of the starting point and the terminal point fall within the coordinate area of the same key; in such a case, there is a possibility that it is improperly determined that the character has been input by a touch operation on the soft keyboard although it is a handwriting operation.

Therefore, in order to prevent such a problem, it is possible that a handwriting input area is separately provided on a display area that is different from the display area where the soft keyboard is displayed. However, in order to obtain a space for screen-displaying the handwriting input area, the display area for screen-displaying other information becomes smaller.

SUMMARY

According to an aspect, a mobile electronic device includes a display that has a touch panel function and a processor that displays a key on the display. When an operation key group having a plurality of keys arranged within a predetermined area is displayed on the display, the processor displays, in a switchable manner, a first arrangement in which each of the keys of the operation key group is arranged within the predetermined area, and a second arrangement in which at least one of the keys of the operation key group is deleted or arranged in a size smaller than a size of a key that is in the first arrangement and that corresponds to the one of the keys and in which a handwriting input area is arranged at a space area that is generated within the predetermined area as the one of the keys is deleted or arranged in a smaller size.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

A detailed explanation is given below, with reference to the drawings, of an embodiment of a mobile electronic device and a key display program that are disclosed in the present application. The disclosed technology is not limited to the present embodiment. Each of the embodiments described below may be combined as appropriate to the extent that there is no contradiction.

[Embodiment]

Figure 1:
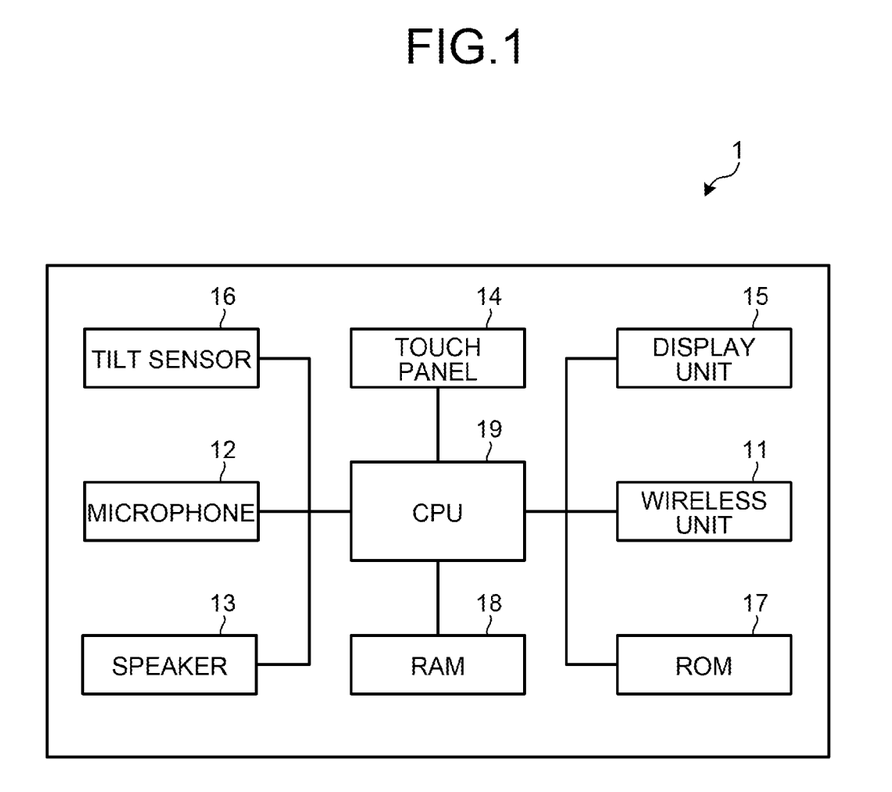
FIG. 1 is a block diagram that illustrates an example of a configuration of a mobile electronic device according to an embodiment.
Figure 2:
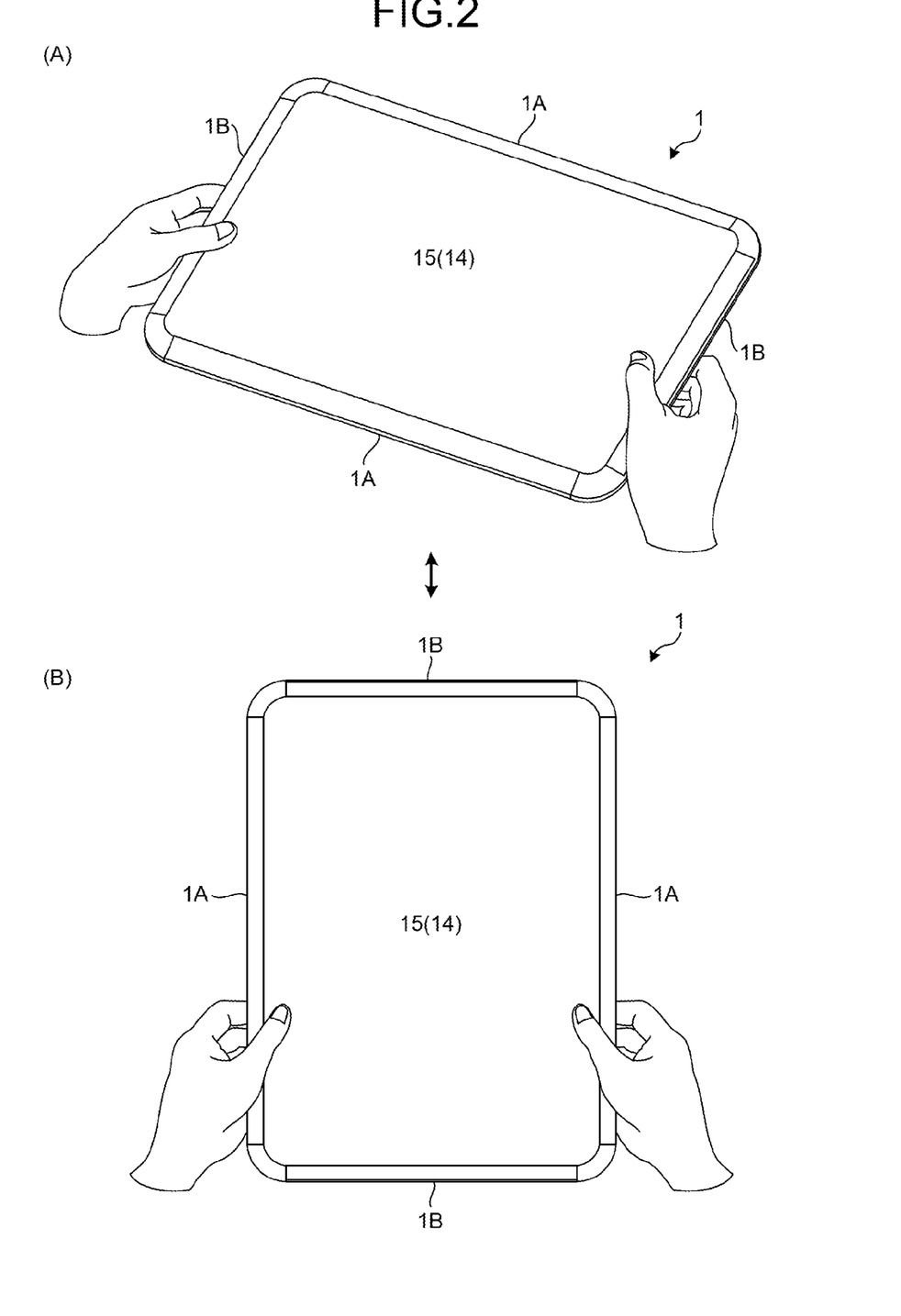
FIG. 2 is an explanatory diagram that illustrates an example of an external configuration of the mobile electronic device.

FIG. 1 is a block diagram that illustrates an example of a configuration of a mobile electronic device according to an embodiment, and FIG. 2 is an explanatory diagram that illustrates an example of an external configuration of the mobile electronic device. A mobile electronic device 1 illustrated in FIG. 1 is a tablet-type electronic device that has, for example, a vertical dimension of 192 mm, a horizontal dimension of 275 mm, and a thickness dimension of 16.2 mm. Furthermore, the mobile electronic device 1 can be used in a portrait or landscape style. In the landscape style, long sides 1A of the mobile electronic device 1 are the top and bottom of a display screen as illustrated in FIG. 2(A) and, in the portrait style, short sides 1B of the mobile electronic device 1 are the top and bottom of the display screen as illustrated in FIG. 2(B).

The mobile electronic device 1 illustrated in FIG. 1 includes a wireless unit 11, a microphone 12, a speaker 13, a touch panel 14, a display unit 15, a tilt sensor 16, a ROM (Read Only Memory) 17, a RAM (Random Access Memory) 18, and a CPU 19. The wireless unit 11 wirelessly communicates with an undepicted wireless network. The microphone 12 collects sounds, and the like. The speaker 13 externally outputs sounds, and the like. The touch panel 14 is mounted on the display screen of the display unit 15 so as to detect a touch operation for a key displayed on the screen display. Furthermore, the touch panel 14 may use, for example, a resistive system, surface acoustic wave system, infrared system, electromagnetic induction system, capacitive system, or the like. The display unit 15 screen-displays various types of information and also screen-displays operation keys for which the touch panel 14 detects a touch operation.

The tilt sensor 16 detects the tilt of the mobile electronic device 1 with respect to a reference position. The CPU 19 identifies the portrait style or landscape style of the mobile electronic device 1 in accordance with a detection result of the tilt sensor 16. Furthermore, the CPU 19 causes the display unit 15 to screen-display a keyboard, numeric keypad, or the like, in the portrait style or landscape style in response to a specified request.

The ROM 17 stores key tables that correspond to various layout screens in the portrait style and landscape style. Furthermore, the layout screens include two types of layout screens of a soft keyboard, e.g., a regular keyboard and a reduced-size keyboard. Specifically, the layout screens include four types of layout screens in total, e.g., two types for the portrait style and two types for the landscape style.

Figure 3:
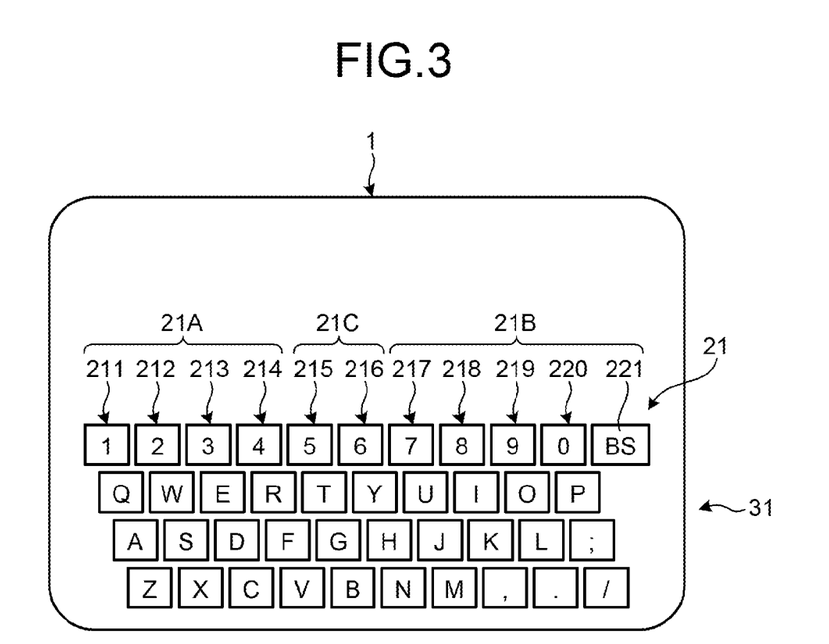
FIG. 3 is an explanatory diagram that illustrates an example of a layout screen of a regular keyboard in a landscape style.

FIG. 3 is an explanatory diagram that illustrates an example of the layout screen of a regular keyboard in the landscape style. The regular keyboard has a layout such that a key group 21 of a QWERTY keyboard is screen-displayed on the display screen. On a layout screen 31 illustrated in FIG. 3, the key group 21 of the QWERTY keyboard (regular keyboard) is screen-displayed on the display screen in the landscape style. Furthermore, the key group 21 of the QWERTY keyboard includes a left column key group 21A, a right column key group 21B, and a middle column key group 21C.

The left column key group 21A includes a first line key group 211, a second line key group 212, a third line key group 213, and a fourth line key group 214. The first line key group 211 includes, for example, the keys "1", "Q", "A", and "Z". The second line key group 212 includes, for example, the keys "2", "W", "S", and "X". The third line key group 213 includes, for example, the keys "3", "E", "D", and "C". The fourth line key group 214 includes, for example, the keys "4", "R", "F", and "V".

The right column key group 21B includes a seventh line key group 217, an eighth line key group 218, a ninth line key group 219, a tenth line key group 220, and a BS key 221. The seventh line key group 217 includes, for example, the keys "7", "U", "J", and "M". The eighth line key group 218 includes, for example, the keys "8", "I", "K", and ";". The ninth line key group 219 includes, for example, the keys "9", "O", "L", and ".". The tenth line key group 220 includes, for example, the keys "0", "P", ";", and "/".

The middle column key group 21C includes a fifth line key group 215 and a sixth line key group 216. The fifth line key group 215 includes, for example, the keys "5", "T", "G", and "B". The sixth line key group 216 includes, for example, the keys "6", "Y", "H", and "N".

Figure 4:
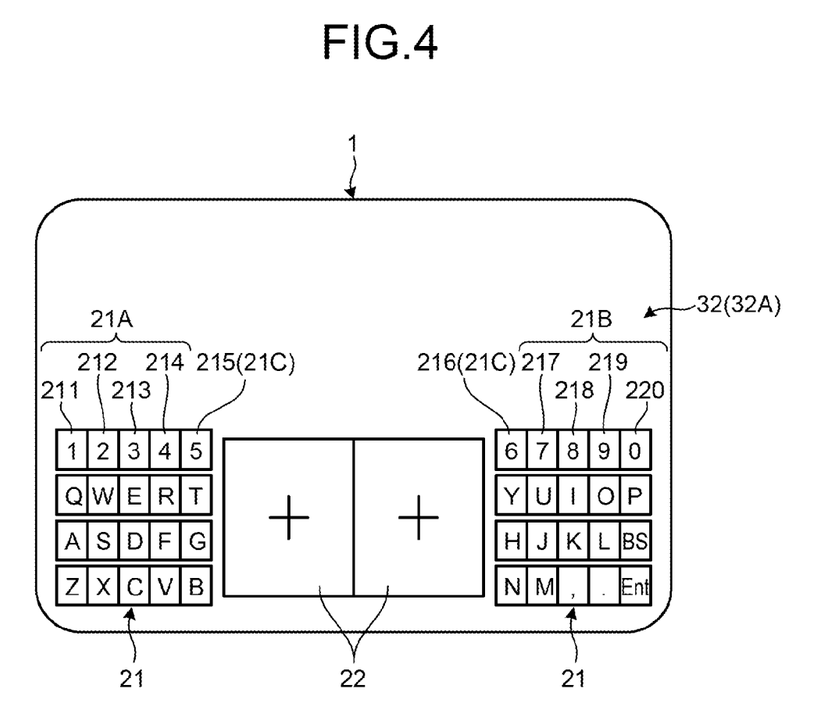
FIG. 4 is an explanatory diagram that illustrates an example of a layout screen of a reduced-size keyboard in the landscape style.

FIG. 4 is an explanatory diagram that illustrates an example of the layout screen of a reduced-size keyboard in the landscape style. The reduced-size keyboard includes the key group 21 of the keyboard that is reduced in size on the display screen in the landscape style and includes two handwriting input areas 22 to which a character is input by a handwriting operation. On a layout screen 32A (32) illustrated in FIG. 4, the reduced-size keyboard is screen-displayed on the display screen in the landscape style.

Figure 5:
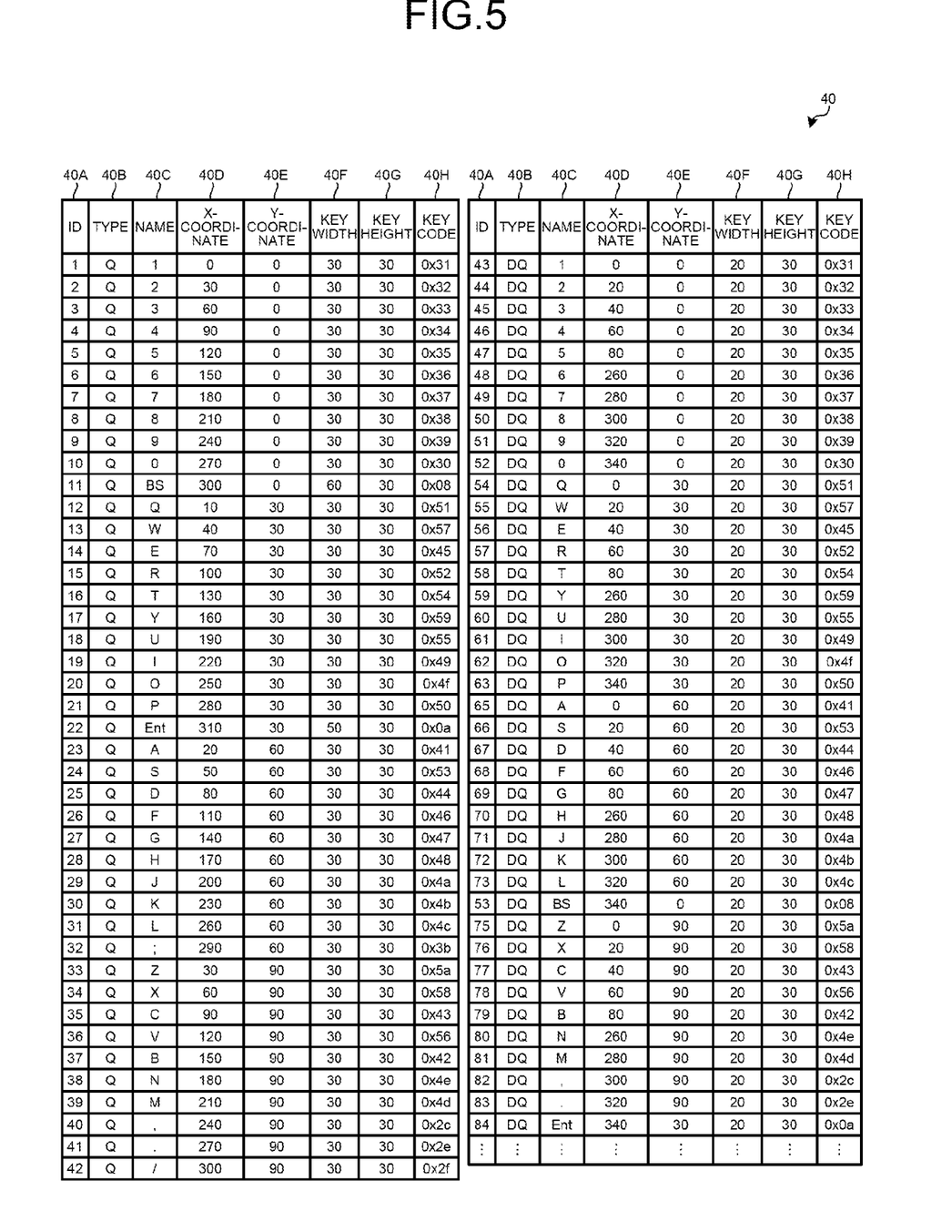
FIG. 5 is an explanatory diagram that illustrates an example of a key table that corresponds to a layout screen in each style.

FIG. 5 is an explanatory diagram that illustrates an example of a key table that corresponds to a layout screen in each style. A key table 40 illustrated in FIG. 5 manages detailed information on each key within each layout screen that is screen-displayed on the display unit 15. In the key table 40, an ID 40A, a type 40B, a name 40C, an X-coordinate 40D, a Y-coordinate 40E, a key width 40F, a key height 40G, and a key code 40H are related to one another for management. The ID 40A is an ID for identifying a key on the screen display and is different depending on a layout screen in each style. The type 40B identifies the type of character that corresponds to a key on the screen display, for example, "Kana", "number", or the like.

The name 40C identifies the display name that corresponds to a key on the screen display. The X-coordinate 40D is an X-coordinate that indicates the starting point of the display coordinate of a key on the screen display. The Y-coordinate 40E is a Y-coordinate that indicates the starting point of the display coordinate of a key on the screen display. The X-coordinate and the Y-coordinate are the coordinate values of the XY coordinate system where the origin is a given point on the display screen of the display unit 15.

The key width 40F indicates a width dimension of a key on the screen display. The key height 40G indicates a vertical dimension of a key on a screen display. The key code 40H corresponds to the details that are related to a key on the screen display, e.g., a character code.

In the example of the key table 40 illustrated in FIG. 5, for example, "1" to "42" of the ID 40A represent the key table 40 of the layout screen 31 of the regular keyboard in the landscape style. Furthermore, "43" to "86" of the ID 40A represent the key table 40 of the layout screen 32A of the reduced-size keyboard in the landscape style.

Attention is given to, for example, "1", "2", and "3" of the ID 40A in the key table 40. With respect to "1" of the ID 40A, the name 40C is "1", the X-coordinate 40D is "0", the Y-coordinate 40E is "0", the key width 40F is "30", the key height 40G is "30", and the key code 40H is "0x31". Furthermore, with respect to "2" of the ID 40A, the name 40C is "2", the X-coordinate 40D is "30", the Y-coordinate 40E is "0", the key width 40F is "30", the key height 40G is "30", and the key code 40H is "0x32". With respect to "3" of the ID 40A, the name 40C is "3", the X-coordinate 40D is "60", the Y-coordinate 40E is "0", the key width 40F is "30", the key height 40G is "30", and the key code 40H is "0x33". Therefore, when, for example, "1", "2", and "3" are to be screen-displayed side by side on the display screen in the landscape style, the CPU 19 displays "1", "2", and "3" with the same size where the key width 40F is "30" and the key height 40G is "30", as illustrated in FIG. 3.

Attention is given to, for example, "43", "44", and "45" of the ID 40A. With respect to "43" of the ID 40A, the name 40C is "1", the X-coordinate 40D is "0", the Y-coordinate 40E is "0", the key width 40F is "20", the key height 40G is "30", and the key code 40H is "0x31". Furthermore, with respect to "44" of the ID 40A, the name 40C is "2", the X-coordinate 40D is "20", the Y-coordinate 40E is "0", the key width 40F is "20", the key height 40G is "30", and the key code 40H is "0x32". With respect to "45" of the ID 40A, the name 40C is "3", the X-coordinate 40D is "40", the Y-coordinate 40E is "0", the key width 40F is "20", the key height 40G is "30", and the key code 40H is "0x33". Therefore, when, for example, "1", "2", and "3" are to be screen-displayed side by side on the display screen in the landscape style, the CPU 19 screen-displays "1", "2", and "3" with the same size where the key width 40F is "20" and the key height 40G is "30". Specifically, as illustrated in FIG. 4, the key size of a key of the reduced-size keyboard is smaller than that of a key of the regular keyboard. Furthermore, the two handwriting input areas 22 are screen-displayed on an area that is empty because of a reduction in the key size of each key of the reduced-size keyboard. Furthermore, the CPU 19 knows the X-coordinate and the Y-coordinate that indicate the starting point on the handwriting input area 22 and further knows the width and the height.

The CPU 19 stores the previously displayed layout screen in the RAM 18. After the CPU 19 determines the current style of the mobile electronic device 1 by using the tilt sensor 16, the CPU 19 acquires, from the ROM 17, the key table 40 of the previous layout that is associated with the current style. After the CPU 19 acquires the key table 40 of the previous layout that is associated with the current style, the CPU 19 generates drawing information on each key on the basis of the name 40C, the X-coordinate 40D, the Y-coordinate 40E, the key width 40F, and the key height 40G of each key in the key table 40. The CPU 19 uses the X-coordinate 40D and the Y-coordinate 40E of the key as a starting point, generates drawing of the key top surface in accordance with the key width 40F and the key height 40G, and generates drawing information in which the display name is centrically displayed on the key top surface in accordance with the name 40C.

When the CPU 19 generates drawing information on each key within the layout screen, the CPU 19 sequentially stores the generated drawing information in the RAM 18. The CPU 19 determines whether the generation of drawing information on all the keys within the layout screen has been completed. If the generation of drawing information on all the keys within the layout screen has been completed, the CPU 19 screen-displays the drawing information stored in the RAM 18 on the display screen of the display unit 15. Conversely, if the generation of drawing information on all the keys within the layout screen has not been completed, the CPU 19 sequentially generates drawing information on the remaining keys within the layout screen. Drawing information on the keys within the layout screen is generated by the CPU 19 in order, for example, in the ascending order of the ID 40A in the key table 40.

The CPU 19 detects the operation coordinates that correspond to a key operation on the display screen of the display unit 15 through the touch panel 14 and acquires, from the key table 40, the key code that is related to the operation coordinates. After the CPU 19 acquires the key code that is related to the operation coordinates, the CPU 19 notifies the acquired key code to, for example, a character input application (hereafter, referred to as an app), such as an address book app. As the CPU 19 notifies the character input app of the key code, the CPU 19 detects that the character that is related to the key code is input to a character entry field that is a character input target on the display unit 15.

Furthermore, the CPU 19 detects the operation coordinates on the display screen of the display unit 15 through the touch panel 14, refers to the key table 40, and, if the operation coordinates are the handwriting input area 22, recognizes a character in accordance with the trajectory of the character on the handwriting input area 22. Moreover, after the CPU 19 recognizes a character, the CPU 19 acquires, from an undepicted table, the key code that is related to the recognized character. After the CPU 19 acquires the key code, the CPU 19 notifies the acquired key code to the character input app. As the CPU 19 notifies the key code to the character input app, the CPU 19 inputs the character that is related to the key code to the character entry field of the display unit 15.

Figure 6:
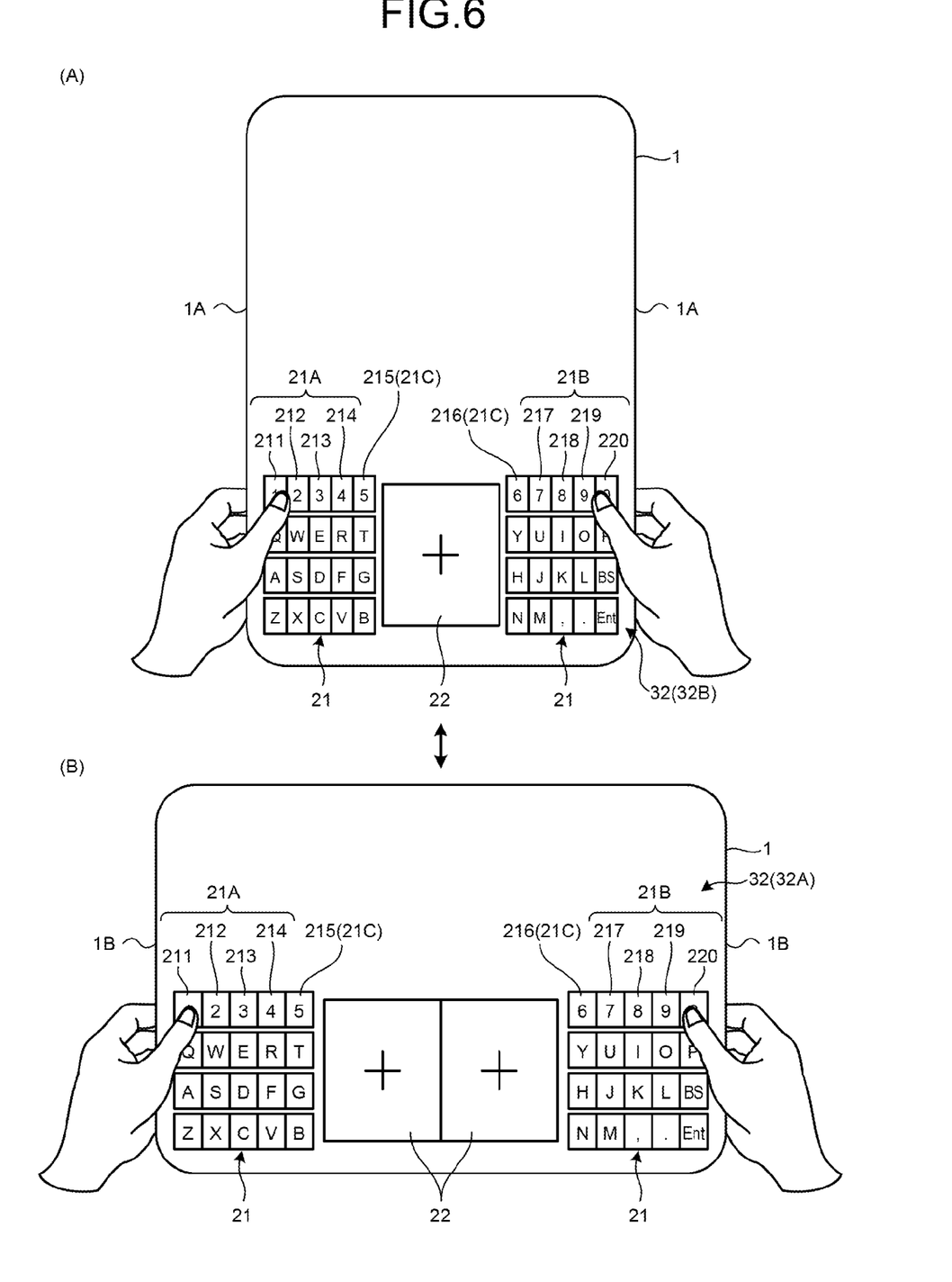
FIG. 6 is an explanatory diagram that illustrates an example of an operation in relation to a switchover to a portrait style or a landscape style of the layout screen of the reduced-size keyboard.

Next, an explanation is given of an operation of the mobile electronic device 1. FIG. 6 is an explanatory diagram that illustrates an example of an operation in relation to a switchover to the portrait style or the landscape style of the layout screen of the reduced-size keyboard. When the mobile electronic device 1 is inclined to be vertical, for example, a layout screen 32B of the reduced-size keyboard in the portrait style is screen-displayed, as illustrated in FIG. 6(A). As a result, a user is able to operate the key group 21 of the keyboard on the layout screen 32B in the portrait style while holding the long sides 1A of the mobile electronic device 1 with his/her hands and is also able to input a character through a handwriting operation on the handwriting input area 22 of the layout screen 32B.

Furthermore, when the mobile electronic device 1 is inclined to be horizontal, for example, the layout screen 32A of the reduced-size keyboard in the landscape style is screen-displayed, as illustrated in FIG. 6(B). As a result, a user is able to operate the key group 21 of the keyboard on the layout screen 32A in the landscape style while holding the short sides 1B of the mobile electronic device 1 with his/her hands and is also able to input a character through a handwriting operation on the handwriting input area 22 of the layout screen 32A. FIGS. 6(A) and (B) illustrate a case where all the keys are displayed with a smaller size; however, the mobile electronic device 1 displays the requested keys with a smaller size so as to provide an area where the handwriting input area 22 can be displayed, and it is optional to reduce the size of all the keys. For example, if the area of a single key is large and if the handwriting input area 22 can be displayed when the size of the single key only is reduced, it is possible to have a configuration such that the size of the single key only is reduced.

Figure 7:
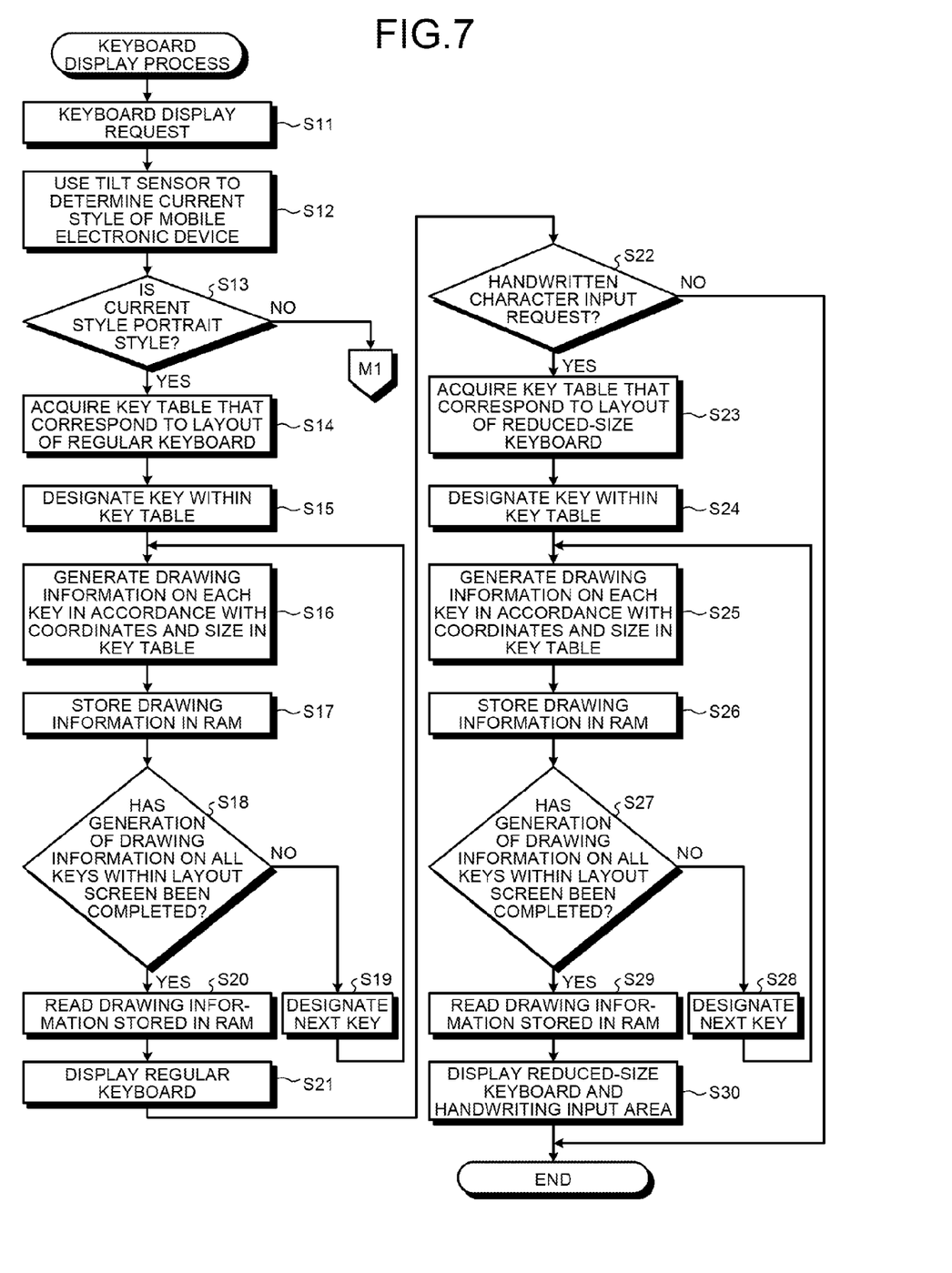
FIG. 7 is a flowchart that illustrates an example of a processing operation of a CPU in relation to a keyboard display process.
Figure 8:
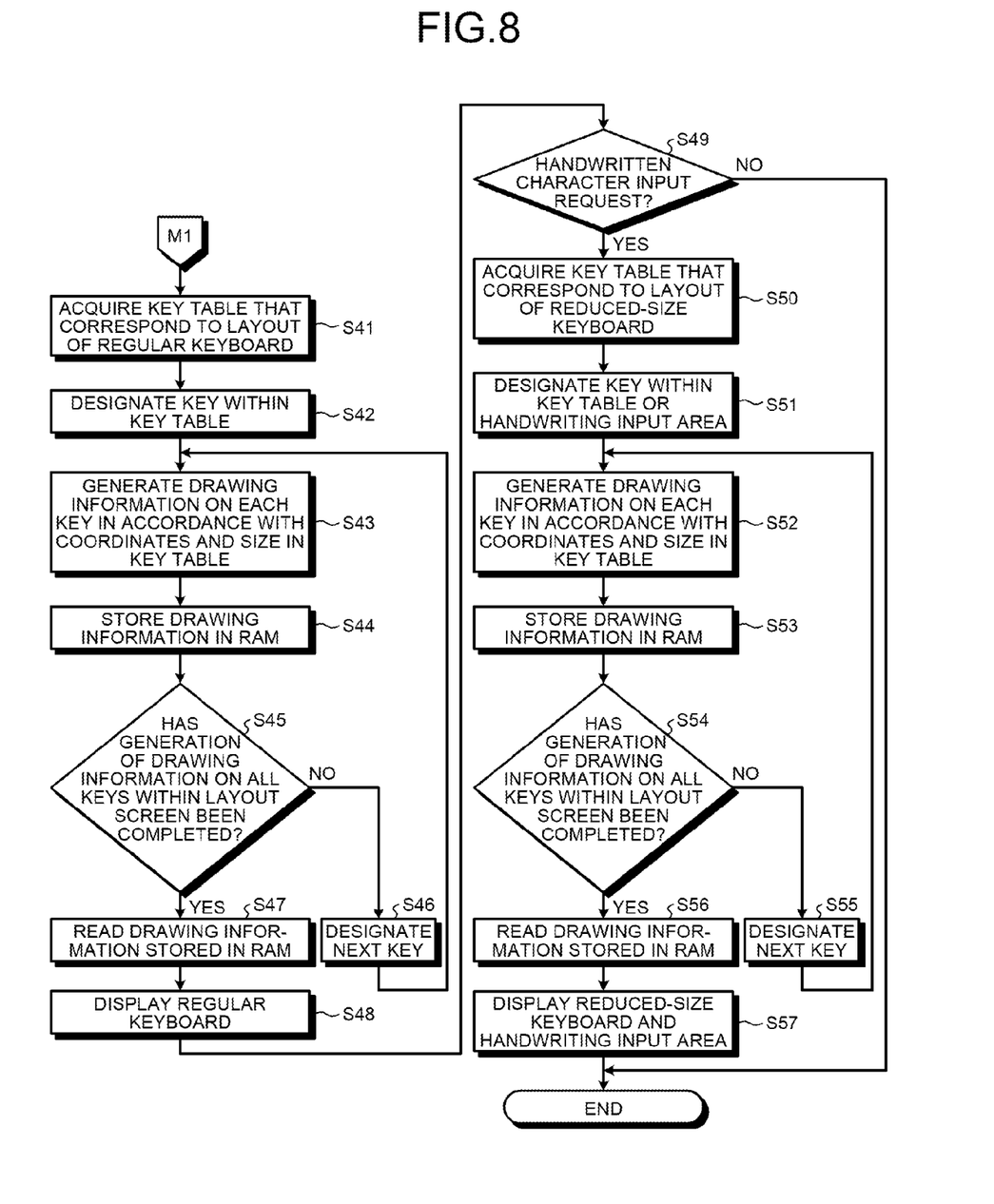
FIG. 8 is a flowchart that illustrates an example of a processing operation of the CPU in relation to the keyboard display process.

FIGS. 7 and 8 are flowcharts that illustrate an example of a processing operation of the CPU 19 in relation to a keyboard display process. The keyboard display process illustrated in FIG. 7 is a process to screen-display the key group 21 of the keyboard, the handwriting input area 22, and the like, on the display unit 15. In FIG. 7, the CPU 19 detects a keyboard display request (Step S11). As for the keyboard display request, when the OS (Operating System) of the mobile electronic device 1, for example, detects an app selection operation on a menu screen, the selected app, e.g., an address book app is started up, and the address book app is screen-displayed on the display unit 15. Furthermore, a monitoring program that operates in parallel with the address book app performs monitoring to see if there is a character entry field for entering a character within the address book app that is being displayed on the screen. If there is a character entry field within the address book app, the monitoring program requests the CPU 19 to display the keyboard.

When the CPU 19 detects a keyboard display request, the CPU 19 uses the tilt sensor 16 to determine the current style of the mobile electronic device 1 (Step S12). In accordance with a determination result, the CPU 19 determines whether the mobile electronic device 1 currently has the portrait style (Step S13). If the mobile electronic device 1 currently has the portrait style (Yes at Step S13), the CPU 19 acquires the key table 40 that corresponds to the layout screen 31 of the regular keyboard (Step S14).

After the CPU 19 acquires the key table 40 that corresponds to the layout screen 31 of the regular keyboard, the CPU 19 designates a key in accordance with the layout screen 31 within the key table 40 (Step S15). The keys on the layout screen are sequentially designated, for example, in the ascending order of the ID 40A. The CPU 19 designates a key and acquires, from the key table 40, the name 40C, the X-coordinate 40D, the Y-coordinate 40E, the key width 40F, and the key height 40G, which are related to the designated key. Moreover, the CPU 19 generates drawing information on the designated key in accordance with the acquired X-coordinate 40D, the Y-coordinate 40E, the key width 40F, and the key height 40G (Step S16). The drawing information includes the display name of the designated key. The CPU 19 then stores, in the RAM 18, the drawing information that corresponds to the designated key (Step S17).

Furthermore, the CPU 19 determines whether the generation of drawing information on all the keys within the layout screen has been completed (Step S18). If the generation of drawing information on all the keys within the layout screen has not been completed (No at Step S18), the CPU 19 designates the next key within the layout screen (Step S19) and proceeds to Step S16 so as to generate drawing information on the designated key. Moreover, if the generation of drawing information on all the keys within the layout screen has been completed (Yes at Step S18), the CPU 19 reads the drawing information stored in the RAM 18 (Step S20). The CPU 19 uses the read drawing information to screen-display the layout screen 31 of the regular keyboard on the display unit 15 (Step S21). Users are able to operate the regular keyboard of the mobile electronic device 1 in the portrait style.

Furthermore, the CPU 19 determines whether a handwritten character input request is detected while the layout screen 31 of the regular keyboard is displayed (Step S22). The handwritten character input request is made by a predetermined touch operation on the layout screen. If a handwritten character input request is detected (Yes at Step S22), the CPU 19 acquires the key table 40 that corresponds to the layout screen 32 of the reduced-size keyboard (Step S23).

After the CPU 19 acquires the key table 40 that corresponds to the layout screen 32 of the reduced-size keyboard, the CPU 19 designates a key in accordance with the layout screen 32 within the key table 40 (Step S24). The keys on the layout screen are sequentially designated, for example, in the ascending order of the ID 40A. The CPU 19 designates a key and acquires, from the key table 40, the name 40C, the X-coordinate 40D, the Y-coordinate 40E, the key width 40F, and the key height 40G, which are related to the designated key. Moreover, the CPU 19 generates drawing information on the designated key in accordance with the acquired X-coordinate 40D, the Y-coordinate 40E, the key width 40F, and the key height 40G (Step S25). In the case of a designated key, the drawing information includes the display name of the designated key. The CPU 19 then stores, in the RAM 18, the drawing information that corresponds to the designated key (Step S26).

Furthermore, the CPU 19 determines whether the generation of drawing information on all the keys within the layout screen has been completed (Step S27). If the generation of drawing information on all the keys within the layout screen has not been completed (No at Step S27), the CPU 19 designates the next key within the layout screen (Step S28) and proceeds to Step S25 so as to generate drawing information on the key. Moreover, if the generation of drawing information on all the keys within the layout screen has been completed (Yes at Step S27), the CPU 19 reads the drawing information stored in the RAM 18 (Step S29). The CPU 19 uses the read drawing information to screen-display the layout screen 32 of the reduced-size keyboard on the display unit 15, as illustrated in FIG. 6(A) (Step S30). Furthermore, the single handwriting input area 22 is screen-displayed on a space area of the display screen that is obtained by reducing the size of the keyboard. Users are able to operate the keyboard and the handwriting input area 22 of the mobile electronic device 1 in the portrait style.

Furthermore, if the mobile electronic device 1 does not currently have the portrait style (No at Step S13), the CPU 19 determines that it has the landscape style and proceeds to M1 that is illustrated in FIG. 8. In M1 that is illustrated in FIG. 8, in the case of the landscape style, the CPU 19 acquires the key table 40 that corresponds to the layout screen 31 of the regular keyboard (Step S41).

After the CPU 19 acquires the key table 40 that corresponds to the layout screen 31 of the regular keyboard, the CPU 19 designates a key in accordance with the layout screen 31 within the key table 40 (Step S42). The keys on the layout screen are sequentially designated, for example, in the ascending order of the ID 40A. The CPU 19 designates a key and acquires, from the key table 40, the name 40C, the X-coordinate 40D, the Y-coordinate 40E, the key width 40F, and the key height 40G, which are related to the designated key. Moreover, the CPU 19 generates drawing information on the designated key in accordance with the acquired X-coordinate 40D, the Y-coordinate 40E, the key width 40F, and the key height 40G (Step S43). The drawing information includes the display name of the designated key. The CPU 19 then stores, in the RAM 18, the drawing information that corresponds to the designated key (Step S44).

Furthermore, the CPU 19 determines whether the generation of drawing information on all the keys within the layout screen has been completed (Step S45). If the generation of drawing information on all the keys within the layout screen has not been completed (No at Step S45), the CPU 19 designates the next key within the layout screen (Step S46) and proceeds to Step S43 so as to generate drawing information on the designated key. Moreover, if the generation of drawing information on all the keys within the layout screen has been completed (Yes at Step S45), the CPU 19 reads the drawing information stored in the RAM 18 (Step S47). The CPU 19 uses the read drawing information to screen-display the layout screen 31 of the regular keyboard on the display unit 15, as illustrated in FIG. 3 (Step S48). Users are able to operate the regular keyboard of the mobile electronic device 1 in the landscape style.

Furthermore, the CPU 19 determines whether a handwritten character input request is detected while the layout screen 31 of the regular keyboard is displayed (Step S49). If a handwritten character input request is detected (Yes at Step S49), the CPU 19 acquires the key table 40 that corresponds to the layout screen 32 of the reduced-size keyboard (Step S50).

After the CPU 19 acquires the key table 40 that corresponds to the layout screen 32 of the reduced-size keyboard, the CPU 19 designates a key in accordance with the layout screen 32 within the key table 40 (Step S51). The keys on the layout screen are sequentially designated, for example, in the ascending order of the ID 40A. The CPU 19 designates a key and acquires, from the key table 40, the name 40C, the X-coordinate 40D, the Y-coordinate 40E, the key width 40F, and the key height 40G, which are related to the designated key. Moreover, the CPU 19 generates drawing information on the designated key in accordance with the acquired X-coordinate 40D, the Y-coordinate 40E, the key width 40F, and the key height 40G (Step S52). In the case of a designated key, the drawing information includes the display name of the designated key. The CPU 19 then stores, in the RAM 18, the drawing information that corresponds to the designated key (Step S53).

Furthermore, the CPU 19 determines whether the generation of drawing information on all the keys within the layout screen has been completed (Step S54). If the generation of drawing information on all the keys within the layout screen has not been completed (No at Step S54), the CPU 19 designates the next key within the layout screen (Step S55) and proceeds to Step S52 so as to generate drawing information on the designated key. Moreover, if the generation of drawing information on all the keys within the layout screen has been completed (Yes at Step S54), the CPU 19 reads the drawing information stored in the RAM 18 (Step S56). The CPU 19 uses the read drawing information to screen-display the layout screen 32 of the reduced-size keyboard on the display unit 15, as illustrated in FIG. 4 (Step S57). Furthermore, the two handwriting input areas 22 are screen-displayed on a space area of the display screen that is obtained by reducing the size of the keyboard. Users are able to operate the reduced-size keyboard of the mobile electronic device 1 in the landscape style.

Furthermore, after the CPU 19 screen-displays the layout screen 32 of the reduced-size keyboard on the display unit 15, the CPU 19 terminates the processing operation illustrated in FIG. 8.

In FIGS. 7 and 8, the CPU 19 determines the current style of the mobile electronic device 1, acquires the key table 40 of the layout screen in accordance with the style, generates drawing information on each key on the basis of the key table 40, and screen-displays the generated drawing information on the display unit 15. As a result, the mobile electronic device 1 is capable of screen-displaying the soft keyboard on the layout screen in accordance with the current style of the mobile electronic device 1.

Furthermore, in the case of the layout screen 32B of the reduced-size keyboard in the portrait style, the CPU 19 reduces the size of the keys of the keyboard so as to screen-display the handwriting input area 22, as illustrated in FIG. 6(A). As a result, even in the case of the portrait style of the mobile electronic device 1, a user is able to operate the handwriting input area 22 from right and left sides (the long sides 1A).

Moreover, in the case of the layout screen 32A of the reduced-size keyboard in the landscape style, the CPU 19 reduces the size of the keys of the keyboard so as to screen-display the handwriting input areas 22, as illustrated in FIG. 6(B). As a result, even in the case of the landscape style of the mobile electronic device 1, a user is able to operate the handwriting input areas 22 from right and left sides (the short sides 1B).

Figure 9:
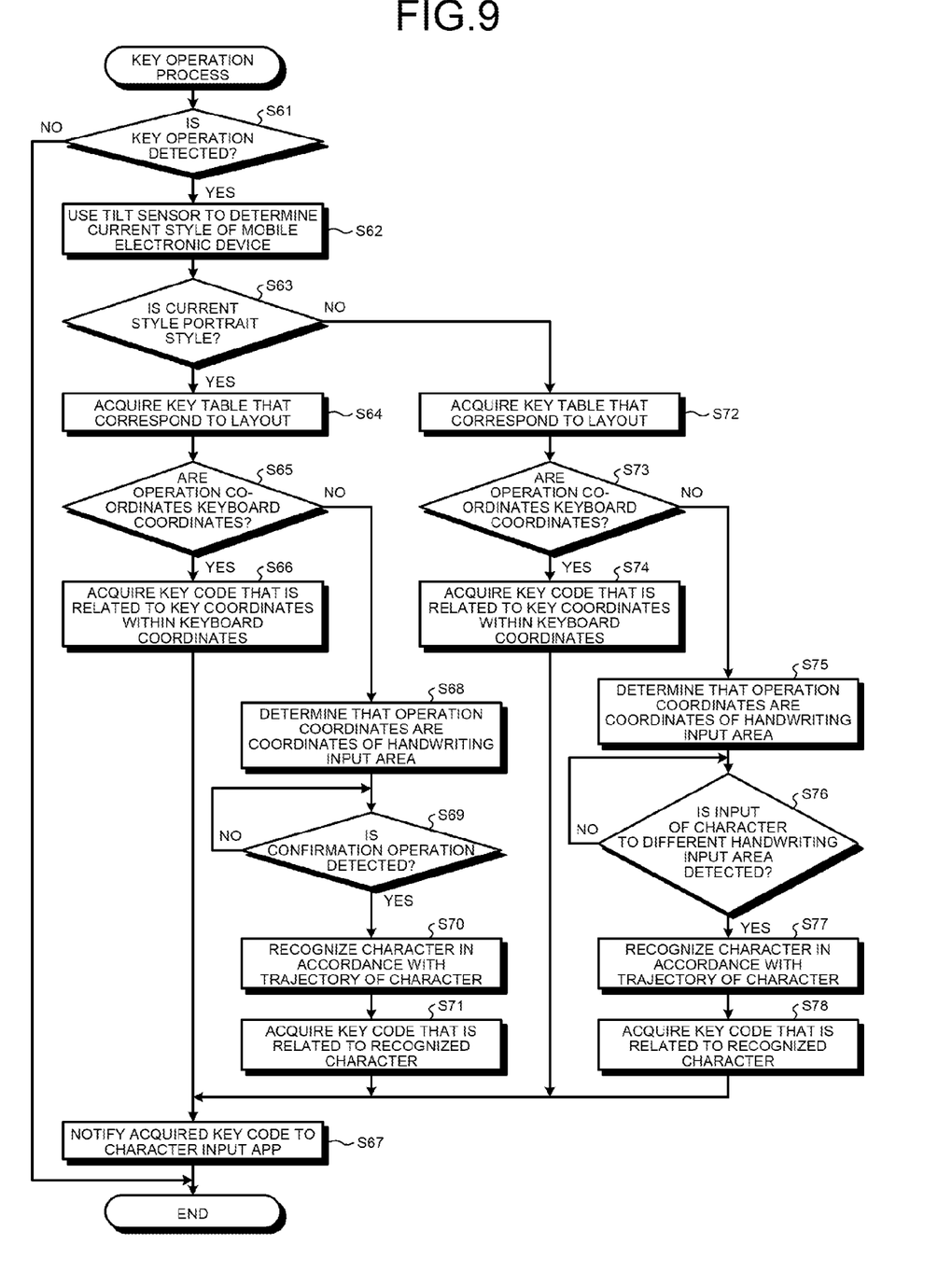
FIG. 9 is a flowchart that illustrates an example of a processing operation of the CPU in relation to a key operation process.

FIG. 9 is a flowchart that illustrates an example of a processing operation of the CPU 19 in relation to a key operation process. The key operation process illustrated in FIG. 9 is a process to perform an operation in response to a key operation on the layout screen that is screen-displayed on the display unit 15, such as the regular keyboard or the reduced-size keyboard. In FIG. 9, the CPU 19 determines whether a key operation is detected on the layout screen that is screen-displayed on the display unit 15 while a character input app, e.g., an address book app, is in operation (Step S61). If a key operation is detected (Yes at Step S61), the CPU 19 determines the current style of the mobile electronic device 1 through the tilt sensor 16 (Step S62). In accordance with a determination result, the CPU 19 determines whether the current style of the mobile electronic device 1 is the portrait style (Step S63).

If the current style of the mobile electronic device 1 is the portrait style (Yes at Step S63), the CPU 19 acquires, from the ROM 17, the key table 40 that corresponds to the layout screen (Step S64). After the CPU 19 acquires, from the ROM 17, the key table 40 that corresponds to the layout screen in accordance with the current style of the mobile electronic device 1, the CPU 19 refers to the key table 40 so as to determine whether the operation coordinates of the key operation are the keyboard coordinates (Step S65).

If the operation coordinates are the keyboard coordinates (Yes at Step S65), the CPU 19 acquires a key code that is related to the key coordinates within the keyboard coordinates (Step S66). After the CPU 19 acquires the key code, the CPU 19 notifies the key code to the current character input app (Step S67) and terminates the processing operation illustrated in FIG. 9.

If the operation coordinates are not the keyboard coordinates (No at Step S65), the CPU 19 determines that the operation coordinates are the coordinates of the handwriting input area 22 (Step S68). If the CPU 19 determines that the operation coordinates are the coordinates of the handwriting input area 22, the CPU 19 determines whether a confirmation operation is detected (Step S69). The confirmation operation corresponds to an operation to complete input of the character in the handwriting input area 22.

If a confirmation operation is detected (Yes at Step S69), the CPU 19 recognizes the character in accordance with the trajectory of the character on the handwriting input area 22 (Step S70). Furthermore, after the CPU 19 recognizes the character in accordance with the trajectory of the character on the handwriting input area 22, the CPU 19 acquires the key code that is related to the recognized character (Step S71) and proceeds to Step S67 so as to notify the acquired key code to the current character input app.

Furthermore, if the current style is not the portrait style (No at Step S63), the CPU 19 then determines that the current style is the landscape style and acquires, from the ROM 17, the key table 40 that corresponds to the layout screen (Step S72). After the CPU 19 acquires the key table 40 that corresponds to the layout screen, the CPU 19 refers to the coordinates in the key table 40 so as to determine whether the operation coordinates are the keyboard coordinates (Step S73).

If the operation coordinates are the keyboard coordinates (Yes at Step S73), the CPU 19 acquires the key code that is related to the key coordinates within the keyboard coordinates (Step S74) and proceeds to Step S67 so as to notify the key code to the current character input app.

Furthermore, if the operation coordinates are not the keyboard coordinates (No at Step S73), the CPU 19 determines that the operation coordinates are the coordinates of the handwriting input area 22 (Step S75). If the CPU 19 determines that the operation coordinates are the coordinates of the handwriting input area 22, the CPU 19 determines whether an input of a character to the different handwriting input area 22 is detected (Step S76). An input of a character to the different handwriting input area 22 means that, for example, while a character is input to one of the handwriting input areas 22 through a handwriting operation, a character is input to the other one of the handwriting input areas 22 through a handwriting operation. Furthermore, an input of a character to the different handwriting input area 22 means that, for example, while a character is input to the other one of the handwriting input areas 22 through a handwriting operation, a character is input to the one of the handwriting input areas 22 through a handwriting operation.

If an input of a character to the different handwriting input area 22 is detected (Yes at Step S76), the CPU 19 recognizes the character in accordance with the trajectory of the character on the handwriting input area 22 to which the character is previously input (Step S77). Furthermore, after the CPU 19 recognizes the character in accordance with the trajectory of the character on the handwriting input area 22, the CPU 19 acquires the key code that is related to the recognized character (Step S78) and proceeds to Step S67 so as to notify the acquired key code to the current character input app.

If an input of a character to the different handwriting input area 22 is not detected (No at Step S76), the CPU 19 determines that the input of the character is not confirmed and proceeds to Step S76 so as to determine whether an input of a character to the different handwriting input area 22 is detected.

In FIG. 9, when the CPU 19 detects a key operation on the layout screen that corresponds to the style of the mobile electronic device 1, and if the operation coordinates are the keyboard coordinates, the CPU 19 acquires the key code that is related to the operation coordinates and notifies the key code to the character input app. Accordingly, the mobile electronic device 1 is capable of recognizing an input of a key to the layout screen even though the style of the mobile electronic device 1 and the layout screen are changed.

Furthermore, if the operation coordinates are the coordinates of the handwriting input area 22, the CPU 19 recognizes the character in accordance with the trajectory of the character on the handwriting input area 22, acquires the key code that is related to the recognized character, and notifies the key code to the character input app. Accordingly, the mobile electronic device 1 is capable of recognizing a handwriting operation on the handwriting input area 22 of the layout screen.

In the embodiment, if the mobile electronic device 1 detects a handwritten character input request while the soft keyboard (the key group 21) is screen-displayed on the display unit 15, the mobile electronic device 1 screen-displays the handwriting input area 22 on an empty display area that is obtained by reducing the size of the keys of the keyboard. As a result, the handwriting input area 22 can be screen-displayed in the mobile electronic device 1 for users as needed while the soft keyboard is displayed. Moreover, if needed, a larger space can be obtained for the handwriting input area 22; thus, it is possible to prevent incorrect input due to a handwriting operation.

In the embodiment, the style is determined in accordance with the tilt of the mobile electronic device 1 and, in the case of the portrait style, the layout screen that corresponds to the portrait style is screen-displayed on the display unit 15 and, in the case of the landscape style, the layout screen that corresponds to the landscape style is screen-displayed on the display unit 15. Accordingly, users are able to use the mobile electronic device 1 in the portrait style or the landscape style.

In the above-described embodiment, when a transition to the layout screen 32 of the reduced-size keyboard is made, the screen area of the handwriting input area 22 is obtained by reducing the size of the keys of the soft keyboard; however, the screen area of the handwriting input area 22 may be obtained by reducing the number of keys of the soft keyboard.

Moreover, one or more keys of the soft keyboard may be deleted, and the handwriting input area 22 may be arranged in the area where the deleted key has been located.

Furthermore, in the above-described embodiment, drawing information is generated on each key within the layout screen; however, drawing information may be generated collectively on all the keys within the layout screen. Moreover, in the above-described embodiment, an explanation is given by using the tablet mobile electronic device 1 as an example; however, a smartphone, portable game device, or the like, is also applicable. Furthermore, in the above-described embodiment, there are two types of layout screens of the soft keyboard for the portrait style and two types for the landscape style; however, these types are not a limitation.

In the above-described embodiment, an undepicted battery supplies power to the RAM 18 regardless of whether the main power source of the mobile electronic device 1 is turned on or off and, if the main power source of the mobile electronic device 1 is turned off, the RAM 18 is capable of storing information, such as the key table 40. However, this is not a limitation, and information, such as the key table 40, may be stored in a flash memory, such as an EPROM.

Each component of each unit illustrated do not necessarily need to be physically configured as illustrated in the drawings. Specifically, specific forms of separation and combination of each unit are not limited to those depicted in the drawings, and a configuration may be such that all or some of them are functionally or physically separated or combined in an arbitrary unit depending on various types of loads or usage.

Furthermore, all or any of various processing functions performed by each device may be implemented by a CPU (Central Processing Unit) (or a microcomputer such as an MPU (Micro Processing Unit), MCU (Micro Controller Unit), or the like). Moreover, it is evident that all or any of the various processing functions may be implemented by programs analyzed and executed by a CPU (or a microcomputer such as an MPU or MCU) or by wired logic hardware.

Figure 10:
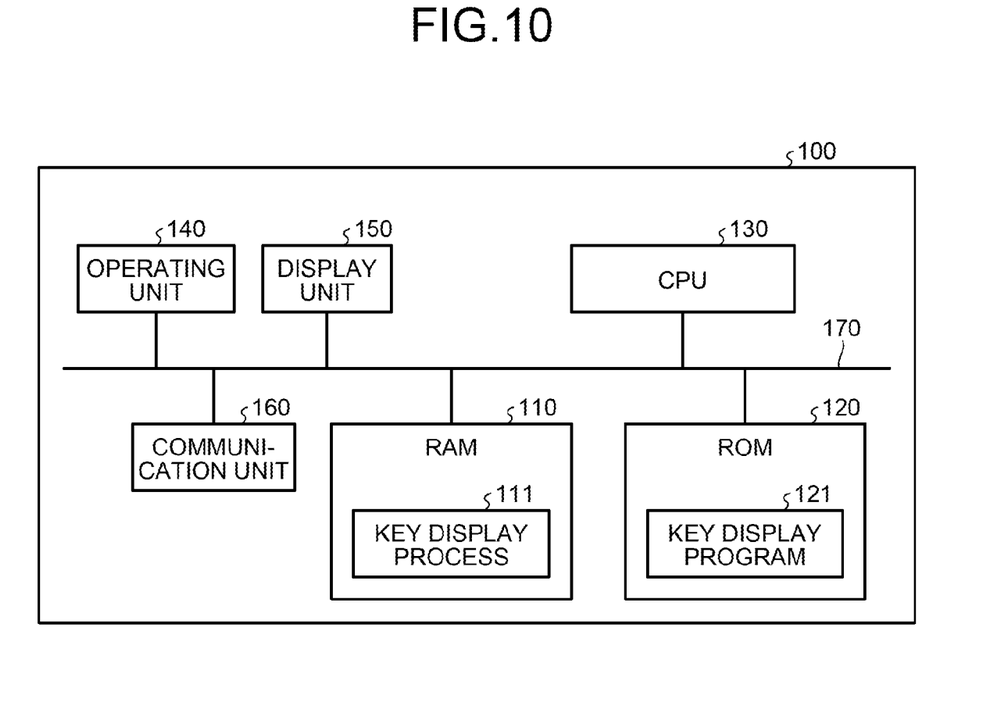
FIG. 10 is an explanatory diagram that illustrates an example of a mobile electronic device that executes a key display program.

The various processes that have been described in the embodiment may be performed if prepared programs are performed by a processor, such as a CPU, of a mobile electronic device. In the following, an explanation is given of an example of a mobile electronic device that executes a program that has the same functionality as that in the above-described embodiment. FIG. 10 is an explanatory diagram that illustrates a mobile electronic device that executes a key display program.

A mobile electronic device 100 that executes the key display program illustrated in FIG. 10 includes a RAM (Random Access Memory) 110, a ROM (Read Only Memory) 120, and a CPU 130. The mobile electronic device 100 further includes an operating unit 140, a display unit 150 that has a touch panel function, and a communication unit 160. In the mobile electronic device 100, the RAM 110, the ROM 120, the CPU 130, the operating unit 140, the display unit 150, and the communication unit 160 are connected to one another via a bus 170.

The ROM 120 pre-stores a key display program 121 that performs the same functionality as that in the above-described embodiment. Instead of the ROM 120, the key display program may be recorded on a computer-readable recording medium by using an undepicted drive. Furthermore, the recording medium may be, for example, a portable recording medium such as a CD-ROM, DVD disk, or USB memory, or a semiconductor memory such as a flash memory. The key display program may be distributed by the CPU 130 as appropriate.

The CPU 130 reads the key display program 121 from the ROM 120 and executes it on the RAM 110. As illustrated in FIG. 10, the key display program 121 functions as a key display process 111 on the RAM 110.

When the CPU 130 detects a predetermined request while each key of the keyboard is screen-displayed on the display unit 150, the CPU 130 reduces the screen area that is included in the screen area of the display unit 150 and is assigned to the keyboard. Furthermore, the CPU 130 assigns an empty screen area, which is due to the reduction, to the handwriting input area for inputting a character through a handwriting operation and screen-displays it. Specifically, when the CPU 130 displays the keyboard within a predetermined area on the display unit 150, the CPU 130 displays, in a switchable manner, first arrangement in which each key of the keyboard is arranged within the predetermined area, and second arrangement in which at least one of the keys of the keyboard is deleted or arranged in a size smaller than the size of a key that is in the first arrangement and that corresponds to the one of the keys and in which a handwriting input area is arranged at a space area that is generated within the predetermined area because the one of the keys is deleted or arranged in a smaller size. As a result, for users, the handwriting input area can be screen-displayed in the mobile electronic device 1 as needed while the soft keyboard is displayed.

By the disclosed device, it is possible to screen-display a handwriting input area in response to a request while a soft keyboard is screen-displayed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

The invention claimed is:

1. A key display device comprising:
   a display that has a touch panel function;
   a detector that detects a tilt of the key display device; and
   a processor that displays a key on the display, wherein
   when an operation key group having a plurality of keys arranged within a predetermined area is displayed on the display,
   the processor displays, in a switchable manner,
      a first arrangement in which each of the keys of the operation key group is arranged within the predetermined area, and
      a second arrangement in which at least one of the keys of the operation key group is deleted or arranged in a size smaller than a size of a key that is in the first arrangement and that corresponds to the one of the keys, while keys of the operation key group other than the deleted key or the arranged key in the smaller size are arranged in the size of the key that is in the first arrangement, and in which a handwriting input area is arranged at a space area that is generated within the predetermined area as the one of the keys is deleted or arranged in a smaller size; and
   when the processor displays the second arrangement,
   the processor determines a number of the handwriting input area arranged in the second arrangement on the basis of a result of the detector.

2. A computer-readable recording medium having stored therein a key display program for a mobile electronic device that comprises: a display that has a touch panel function, a detector that detects a tilt of the mobile electronic device and a processor that displays a key on the display, the key display program causing the processor to execute a process comprising:
   when an operation key group having a plurality of keys arranged within a predetermined area is displayed on the display,
   displaying, in a switchable manner, a first arrangement in which each of the keys of the operation key group is arranged within the predetermined area, and a second arrangement in which at least one of the keys of the operation key group is deleted or arranged in a size smaller than a size of a key that is in the first arrangement and that corresponds to the one of the keys, while keys of the operation key grow other than the deleted key or the arranged key in the smaller size are arranged in the size of the key that is in the first arrangement, and in which a handwriting input area is arranged at a space area that is generated within the predetermined area as the one of the keys is deleted or arranged in a smaller size; and
   when displaying the second arrangement,
   determining a number of the handwriting input area arranged in the second arrangement on the basis of a result of the detector.

* * * * *